Jan. 5, 1965  J. B. SHIELDS ETAL  3,164,473
DRY MILK PRODUCT AND PROCESS OF MANUFACTURE
Original Filed July 19, 1957
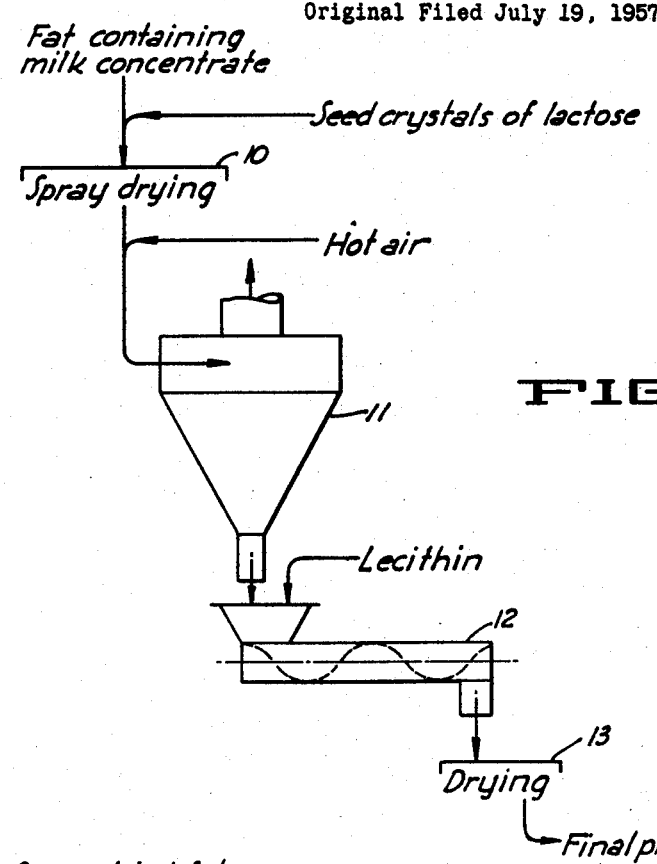
FIG_1_
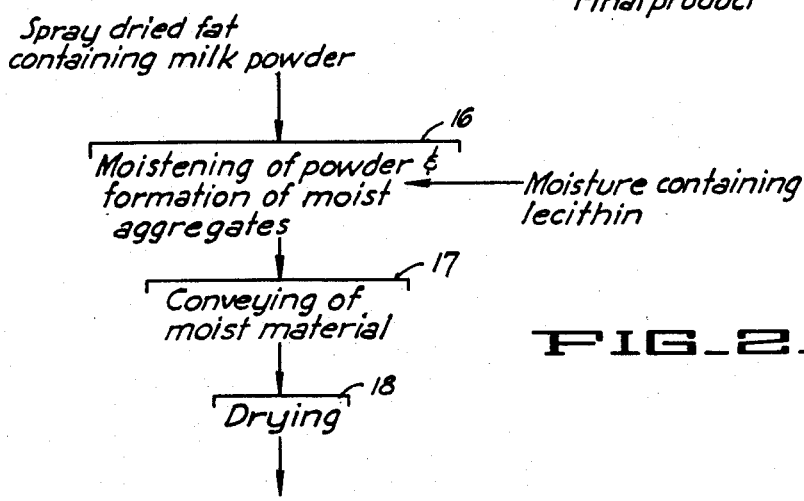
FIG_2_
INVENTORS
JOHN B. SHIELDS
LOUIS J. NAVA
BY CLAYTON A. KEMPF
ATTORNEYS

United States Patent Office 3,164,473
Patented Jan. 5, 1965

3,164,473
DRY MILK PRODUCT AND PROCESS OF MANUFACTURE
John B. Shields, Sunnyvale, Louis J. Nava, Redwood City, and Clayton A. Kempf, Berkeley, Calif., assignors to Dairy Foods Incorporated, Oakland, Calif., a corporation of California
Continuation of application Ser. No. 672,893, July 19, 1957. This application May 28, 1963, Ser. No. 283,822
8 Claims. (Cl. 99—56)

This invention relates generally to dry fat-containing milk products and processes for their manufacture.

Dry milk products such as are produced by conventional spray drying are known to be difficult to disperse in cold water to form a reconstituted milk, due mainly to poor wettability and a tendency to form sticky lumps. Of recent years, dry skim milk in particular has been made in the so-called "instant" form. Instant skim milk differs from the normal spray dried product in that it has good wettability, and it can be readily dispersed in cold water by simple stirring. Its physical form differs from conventional spray dried skim milk in that, in contrast with the small particle size possessed by spray dried skim milk, the individual fragments are in the form of porous aggregates which may have a size such that the bulk of the fragments remain on a 100 mesh screen. Such an aggregated product has high wettability whereby when a quantity of the powder is deposited upon the surface of cold water, the powder mass wets and sinks within a short interval, and disperses upon simple stirring with a spoon, without the formation of sticky lumps.

Processes used in the past for the commercial production of instant skim milk powder have either produced the desired aggregated form by a straight through procedure, commencing with a liquid concentrate and proceeding directly to the formation of porous aggregates, or by a wet back procedure involving moistening spray dried powder to make the individual particles sticky and causing the sticky particles to be brought into random contacts to form the porous aggregates. In either event it has been found that when the processes are employed for the production of products having a substantial fat content, such as whole milk, the final product does not have the desired instant properties. Particularly when a quantity of such material is deposited upon the surface of cold water it does not tend to wet and sink but on the contrary it tends to float, and when stirred, sticky lumps are formed.

In general it is an object of the present invention to provide a dry fat-containing milk product having instant properties in that it is highly wettable and can be readily dispersed in cold water by simple stirring.

Another object of the invention is to provide a novel process for the manufacture of the above product.

Another object of the invention is to provide a process of the above character which does not impair palatability, flavor, or solubility of the final product.

Additional objects of the invention will appear from the following description in which the preferred embodiments have been set forth in detail in conjunction with the accompanying drawing.

Referring to the drawing:

FIGURE 1 is a flow sheet illustrating one procedure for carrying out the invention.

FIGURE 2 is another flow sheet illustrating another embodiment of the invention.

The present invention makes use of lecithin in a particular manner to produce a fat-containing milk product having instant properties. Lecithin has been used in the food industry for a variety of purposes. It is known to be an emulsifying and surface active wetting agent. However, if small amounts of lecithin are mechanically intermixed with dry whole milk powder, wettability and dispersibility of the powder in cold water is not materially benefited. This is true whether the powder is in the finely divided form as in spray drying, or in the form of larger aggregates. The present invention is predicated upon our discovery that if lecithin is incorporated with the product under certain conditions, wettability of the product is remarkably improved, thus providing a product having instant properties comparable to instant dry skim milk.

In accordance with the procedure illustrated in FIGURE 1, it is assumed that an aggregated whole milk product is being manufactured by a straight through type of process such as taught in Sharp et al. Patent 2,921,857. Such a process involves the spray drying of a concentrate containing seed crystals of lactose. In accordance with the flow sheet a fat-containing milk concentrate such as whole milk containing from 40 to 50% solids (about 46% optimum) is supplied to the spray drying operation 10. Spray drying can be carried out by the use of spray drying equipment of the Peebles type (see case 2,575,119), making use of a centrifugal atomizer and withdrawal of the dried product from the lower conical end portion of the drying chamber. Immediately before being supplied to the spray dryer, seed crystals of lactose are introduced into the concentrate as illustrated. By way of example, the amount of seed crystals introduced can amount to from 0.1 to 10% of the total lactose present. Preferably the seed crystals are of small particle size, such as impalpable powder of minus 300 mesh.

The drying conditions within the spray drying chamber are controlled in such a manner that the discharging material contains considerable moisture. For example, the total moisture content of the material leaving the chamber may range from about 7 to 12% (10% optimum). In a typical instance the temperature of the discharging drying air may be about 125° F., and the powder withdrawn at a temperature of about 90 to 100° F.

The stream of withdrawn material, including the solids and some suspending air from the drying chamber, is delivered to a suitable separating means such as the pneumatic separator 11 of the cyclone type. As indicated, it is desirable to add hot air into the stream of material entering the cyclone, whereby the material is heated before its discharge. Assuming for example that the added hot air is at a temperature of the order of 250° F., the material leaving the cyclone 11 can be at a temperature of from 110 to 140° F. (125° F. optimum).

In accordance with the procedure disclosed in said Patent 2,921,857, the moist material is held for an interval before being subjected to final drying, and during this interval the material is subjected to slow working. The device 12 used for this purpose can be in the form of a scroll conveyor, which is driven at a relatively low speed, and which receives the material from the cyclone. After being held in the scroll conveyor for a period of the order of from 10 to 120 seconds, it is delivered to the final drying operation 13, where the moisture content is reduced to a value of the order of from 1.5 to 3%. Before packaging, the dried material can be subjected to a sizing operation, with return of undersized finely divided material to the process. The sizing may for example be such that the bulk of the final product passes through an 18 mesh screen, but remains on a 100 mesh screen. It is convenient to carry out drying by use of drying equipment of the shaker type, with the drying air being at a temperature (inlet) of the order of 240° F., and the powder being at a temperature of the order of 160–170° F.

Before the material is subjected to the final drying operation 13, and while it is in moist condition, it is contacted with lecithin. As indicated, lecithin can be introduced into the inlet of the scroll device 12, where it contacts and is intermixed with the moist material, before the same is subjected to final drying. The lecithin may be dispersed in a suitable liquid medium, such as a fatty oil.

Lecithin is the commercial or popular name for a crude mixture of compounds which may be more accurately designated as phosphatides or phospholipids. The phosphatides are complex organic compounds which are similar to fats or lipids, but differ from fats radically enough to give them unique properties. Lecithins of vegetable oil origin are mixtures of phosphatides produced from such raw materials as cottonseed oil, corn oil, or soybean oil. Products from current commercial treatments modifying natural lecithin to emphasize either the lipophilic groups or the hydrophilic groups, may be used for our purpose. Commercially available soya lecithin has been used with good results. It is commercially available as a liquid material with lecithin dispersed in a soybean oil carrier. In the process of FIGURE 1 such a liquid lecithin product, containing about 60% lecithin(s), can be dripped into the intake end of the scroll device 12 at a regulated rate, whereby for each 100 pounds of final dried product, there is substantially from 0.25 to 1.0% of the lecithin product (i.e., 0.17–0.6% lecithin(s)).

The fact that the milk solids are in moist condition while lecithin is being incorporated with the same, appears to play an important part in securing effective distribution. In addition distribution preferably is aided by having the powder at this time at a temperature in excess of the melting point of the butter fat (about 110° F.). As previously mentioned the hot air supplied to the stream of material flowing to separator 11 serves to heat the moist material, whereby at the time of contact with the lecithin, the material is at a temperature of the order of from 110 to 140° F. During its passage through the scroll device 12, the material remains within this temperature range. Movement or working of the material within the scroll device 12 aids in securing good distribution of the lecithin, while at the same time avoiding sufficient agitation as to cause crushing of the aggregates.

The final product produced from the foregoing process has the desired "instant" properties. When a quantity of this powder is deposited upon the surface of cold water, the water quickly penetrates the mass and the individual porous aggregates, without blocking, whereby the entire mass quickly wets and sinks. Simple stirring applied either simultaneously with depositing the powder or immediately thereafter, serves to effectively disperse the powder to form a stable reconstituted milk, without formation of lumps. The major part of the lactose present is in the form of alpha lactose monohydrate, whereby the product is relatively nonhygroscopic. Reconstituted milk made by use of the product is substantially indistinguishable from fresh whole dairy milk. There is no impairment of palatability, flavor, or solubility.

Because the fat content is subject to oxidation, it is desirable for a commercial product of this type to be marketed in sealed containers, such as suitable cans.

In the process of FIGURE 2, an instantizing procedure is shown involving the moistening of spray dried fat-containing milk powder. Such a process is disclosed in British Patent 753,600, dated December 22, 1953. As indicated a finely divided fat-containing milk powder such as spray dried whole milk, is supplied to an operation 16, which can be carried out in a suitable chamber into which the spray dried powder is introduced together with a stream of conveying air. Within the chamber the dispersed powder is caused to pass through a zone into which moisture is introduced whereby the particles are moistened and made sticky. The sticky particles are brought into random contacts, whereby moist porous random aggregates are formed. In accordance with the present process lecithin is added with the moisture as indicated. Assuming the use of a liquid soya lecithin product as previously described, a proper amount of the lecithin product is first dispersed in water, and this water then introduced into the treatment chamber in atomized form. As described in said British Patent 753,600, it is desirable for a portion of the moisture to be in atomized form, and another portion in the form of saturated steam which serves to elevate the temperature of the treatment zone to a temperature ranging from 80 to 150° F. Preferably the solids being treated attain a temperature level of from about 110 to 140° F. The moist porous aggregates from operation 16 are collected on the conveyor 17 (e.g., an endless belt) and delivered to the drying operation 18, which can be carried out in the same manner as the drying operation 13 of FIGURE 1.

In general the product made in accordance with the process of FIGURE 2 has the same characteristics as produced by the first described process. The dried material possesses the same instant properties as previously described, and likewise the processing does not noticeably impair the palatability, flavor, or solubility of the reconstituted milk.

In the process of FIGURE 2, the moisture content of the material undergoing treatment, as a result of operation 16, may be somewhat higher than the moisture content of the material entering the scroll device 12 of FIGURE 1. For example, as described in said British Patent No. 753,600, the moisture content of the material leaving the treatment chamber where operation 16 is carried out may be of the order of from 10 to 16%, about 13% being deemed optimum.

The amount of lecithin used in the process of FIGURE 2 can be substantially the same as the amounts used for FIGURE 1. For example, for 95 parts of moisture supplied to the operation 16, we may use about 5 parts of the liquid lecithin product, whereby when the amount of moisture added is such that the material leaving operation 16 contains about 13% moisture (total), the final dried material will contain about 0.75% of the lecithin product (i.e., about 0.45% lecithin(s)). In some instances we may use small amounts of a synthetic detergent (e.g., Dreft) to aid dispersion of the lecithin product in the water.

The final dried material from the process of FIGURE 2 may have substantially the same total moisture as the material from the process of FIGURE 1, namely from about 1.5 to 3%, and likewise the size of the aggregates may be comparable. Here again sizing can be applied, with return of undersized material to the process, whereby the bulk of the material may pass through a 16 mesh screen, but remain upon a 100 mesh screen.

The procedure of FIGURE 2 can be modified with respect to the way in which lecithin is added. Thus instead of adding the lecithin with the moisture, an equivalent quantity of liquid soya lecithin product can be dry mixed with the spray dried milk powder being supplied to the process. For this purpose suitable mixing equipment can be used which effects a fair distribution to the powder particles. When such powder is supplied to step 16, moisture is applied whereby the milk solids not only become moist and sticky and adhere together in the form of moist aggregates, but in addition effective distribution of the lecithin takes place to produce a final product having the desired instant properties.

In the foregoing particular reference has been made to the manufacture of a whole milk product. A typical dried whole milk product, having a water content of 2%, may have a butterfat content of about 28%. It will be evident that our invention is applicable to products having a lower fat content than whole milk, as for example, products having a reduced fat content ranging from say 7 to 28%. Also it will be evident that the fat content can be made greater than normal whole dried milk, as for example, from 28 to 72% (dried cream).

Although particular reference has been made to application of the process to milk solids containing butterfat, various other fats or fatlike substances can be substituted for all or a part of the butterfat content. Such fats should be edible, relatively free from fatty acid, and with a melting point of the order of 90 to 110° F. For example, reference can be made to any one of a number of edible hydrogenated vegetable oils such as hydrogenated cottonseed, peanut, safflower and corn oils.

Specific examples of our invention are as follows:

*Example 1*

Whole milk was concentrated by vacuum evaporation to 46% solids. This concentrate was fed to a spray dryer of the Peebles type, with the temperatures and flow rates of the drying air adjusted whereby the discharging milk solids had a moisture content of 10% (total). Seed crystals of lactose were intermixed with the concentrate immediately before supplying the concentrate to the spray dryer. The amount of lactose thus added amounted to 0.1% of the lactose content of the concentrate. The size of the seed crystals was such that the bulk of the crystals passed through a 300 mesh screen. The powder leaving the spray drying operation had a temperature of about 90 to 100° F. The material discharging from the spray dryer, comprising the moist milk solids and a conveying stream of air, was supplied to the cyclone separator 11, and the collected material supplied to the scroll device 12. Hot air at a temperature of about 250° F. was blended with the stream of material being supplied to the cyclone 11, whereby the powder leaving the cyclone 11 was at a temperature of 125° F. A liquid lecithin product was slowly fed into the inlet end of the scroll device 12. The product used was that known by the trade name of "Clearate, W.D.F." manufactured by W. A. Cleary Co. The amount of this product used was such that it amounted to about .65% of the final dried product (i.e., about 0.4% lecithin(s)). The material remained in the scroll device 12 for about fifteen seconds. Final drying was carried out by the use of drying equipment of the shaker type, with the drying air supplied to the same being at a temperature of 240° F. About four minutes was required for complete drying to produce a final product containing 2% moisture. The final product was tested for wettability by depositing 20 grams of the powder upon the surface of 140 cc. of water at 70° F. Immediately thereafter the water was stirred with a common spoon. Within ten seconds the entire mass of powder had sunk into the body of water and had been completely dispersed to form a stable reconstituted milk. The reconstituted milk was substantially indistinguishable from fresh whole milk, insofar as palatability, flavor, and stability were concerned. The solubility index of the powder was about 0.20 ml.

*Example 2*

A good quality spray dried whole milk powder was obtained, having a particle fineness such that the bulk of the particles passed through a 100 mesh screen. The major part of the lactose content was in the amorphous or non-crystalline form. This powder was then passed through a hydrating and aggregating equipment of the type disclosed in said British Patent No. 753,600. Lecithin was dispersed in the water supplied to the treatment chamber. In addition to the supply of atomized moisture, saturated steam was supplied to maintain the temperature of the treatment zone at about 140° F. With respect to the total amount of moisture supplied, about 5% of the same comprised the liquid lecithin product as used in Example 1. The moisture content (total) of the porous aggregates leaving the treatment chamber was about 13%. The moist porous aggregates were held in step 17 for a period of about 15 seconds, and then subjected to final drying in step 18 by the use of dryers of the shaker type. Drying equipment and temperatures were the same as used for Example 1. The final product produced had the same characteristics as the product produced from Example 1.

*Example 3*

Example 2 was modified as follows: Instead of adding the soya lecithin product with the water, it was dry mixed with the spray dried whole milk powder, whereby the powder supplied to operation 16 contained about 0.65% lecithin product, or about 0.4% lecithin(s). This material was treated in operation 17 under the same conditions as in Example 2. The final product had substantially the same instant properties as the product from Examples 1 and 2.

In the foregoing disclosure various percentages of lecithin have been mentioned. In general the instant properties can be obtained to a marked degree by incorporating lecithin in amounts as low as 0.1%, in accordance with the present invention. However, best results were obtained with the lecithin content at the level of about 0.3% (0.5% commercial soya lecithin product). A desirable range is from about 0.3 to 1.0%, although greater percentages can be used if desired. The moisture content provided in conjunction with incorporation of the lecithin, may as disclosed above, vary from 7 to 16%, depending upon processing procedures employed. An elevated temperature at the time of incorporation appears to contribute to the desired results and may, for the various procedures employed, range from about 100 to 140° F.

In general we have provided a process capable of incorporating lecithin in a dry powdered fat-containing milk product in such a fashion as to provide greatly enhanced wettability. The novel milk product produced by the process has the desired "instant" properties, and can be used in the same manner as so-called instant dry skim milk. Particularly it can be quickly reconstituted with cold water to produce a stable reconstituted milk, whereas ordinary fat-containing milk powder, whether in finely divided form or in the form of aggregates, does not possess such characteristics.

This application is a continuation of our copending application Serial No. 672,893, filed July 19, 1957, now abandoned.

We claim:

1. In a method for the processing of fat-containing milk solids, the steps of causing moist porous aggregates of said solids to be contacted with added extraneous lecithin, the aggregates having a moisture content of the order of 7 to 16%, causing the aggregates to be at a temperature level above ambient to promote distribution of the lecithin, and removing excess moisture from the aggregates to form the final product, the amount of lecithin added being sufficient to provide a lecithin content of from 0.1 to 1% of the final dry product.

2. A method as in claim 1 in which the moist aggregates are formed by direct spray drying of a liquid fat-containing milk and the lecithin is added to such moist aggregates for contact therewith.

3. A method as in claim 1 in which the moist aggregates are formed by adding moisture to a dry fat-containing spray dried milk powder whereby the powder particles are made sticky and by causing the sticky particles to contact and adhere together in aggregate form, and in which the lecithin is added together with the addition of said moisture to the powder.

4. A method as in claim 2 in which the moist aggregates are subjected to mechanical working after addition of said lecithin, and before final drying.

5. In a method for the processing of fat-containing milk solids, the steps of causing moist porous aggregates of said solids to be contacted with added lecithin, causing the aggregates to be at a temperature level of the order of from 100 to 140° F. to promote distribution of the added lecithin, and removing excess moisture from the aggregates to form a final dry product having a moisture content of the order of from 1.5 to 3%, the amount of lecithin added being sufficient to provide a lecithin content in the final dry product of from 0.1 to 1%.

6. A method as in claim 1 in which the moist aggregates are formed by adding moisture to a dry fat-containing spray dried milk powder whereby the powdered particles are made sticky and by causing the sticky particles to contact and adhere together in porous aggregate form, and in which the lecithin is dry mixed with the spray dried milk powder before the milk powder is moistened.

7. In a process for producing a fat-containing dry milk product wherein fat-containing spray dried milk particles are moistened to make them sticky and the sticky particles are caused to adhere together in the form of moist porous aggregates from which excess moisture is then removed, the improvement comprising incorporating lecithin into the porous aggregates by dry mixing lecithin with the dry milk particles prior to the moistening thereof.

8. A dry fat-containing milk product produced by the method of claim 1 comprising fat-containing milk solids in the form of porous aggregates, the aggregates consisting of powder particles bonded together, the product having from about 0.1 to 1% of extraneous lecithin applied thereto and distributed thereon, the product having enhanced wettability and surface activity whereby when a quantity of the product is added to water, simple stirring for a period of the order of ten seconds serves to completely disperse the solids.

References Cited in the file of this patent
UNITED STATES PATENTS

| | | |
|---|---|---|
| 1,537,060 | Beardslee | May 12, 1925 |
| 2,016,592 | Chuck | Oct. 8, 1935 |
| 2,399,565 | North et al. | Apr. 30, 1946 |
| 2,832,686 | Louder | Apr. 29, 1958 |

FOREIGN PATENTS

| | | |
|---|---|---|
| 9,343 | Great Britain | of 1915 |
| 753,600 | Great Britain | July 25, 1956 |

OTHER REFERENCES

Food Manufacture, vol. XVI, No. 2, Feb. 1, 1941, page 27, 99/136 Lit.